(12) United States Patent
Rawlings et al.

(10) Patent No.: US 9,976,620 B2
(45) Date of Patent: May 22, 2018

(54) SYSTEM AND METHOD FOR A BUSHING ASSEMBLY HAVING RADIAL RUBBER STOPPER

(71) Applicant: The Pullman Company, Milan, OH (US)

(72) Inventors: Scott W. Rawlings, North Ridgeville, OH (US); Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 74 days.

(21) Appl. No.: 15/261,185

(22) Filed: Sep. 9, 2016

(65) Prior Publication Data

US 2017/0097061 A1  Apr. 6, 2017

Related U.S. Application Data

(60) Provisional application No. 62/237,020, filed on Oct. 5, 2015.

(51) Int. Cl.
| | |
|---|---|
| *F16F 1/38* | (2006.01) |
| *F16F 1/371* | (2006.01) |
| *B60G 21/055* | (2006.01) |
| *B60G 3/06* | (2006.01) |

(52) U.S. Cl.
CPC .............. *F16F 1/3835* (2013.01); *B60G 3/06* (2013.01); *B60G 21/0551* (2013.01); *F16F 1/371* (2013.01); *F16F 1/3863* (2013.01); *B60G 2200/142* (2013.01); *B60G 2204/1222* (2013.01); *B60G 2204/1431* (2013.01); *B60G 2204/41* (2013.01); *B60G 2204/4104* (2013.01)

(58) Field of Classification Search
CPC ........ F16F 1/3835; F16F 1/3863; F16F 1/371; B60G 21/0551; B60G 2204/41
USPC ................ 267/141.2, 140.12, 219, 293, 294; 384/145, 153
See application file for complete search history.

(56) References Cited

U.S. PATENT DOCUMENTS

| | | | | |
|---|---|---|---|---|
| 3,703,761 A | * | 11/1972 | Van Winsen | ....... F16C 11/0614 29/436 |
| 4,139,246 A | * | 2/1979 | Mikoshiba | ............... B60G 7/02 264/261 |
| 5,058,867 A | * | 10/1991 | Hadano | .................. B60G 7/005 248/635 |
| 5,540,420 A | * | 7/1996 | Luzsicza | ............... F16C 27/063 267/141.1 |

(Continued)

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

The present disclosure is directed to a bushing assembly having a tubular inner metal, a tubular outer metal, a tubular rigid cup disposed over an outer portion of the tubular inner metal, and a tubular pad disposed between the tubular rigid cup and the tubular outer metal. The tubular pad may have a first wall section and a second wall section at least partially circumscribing the first wall section. The first wall section may be configured to be compressed and to expand along an axis parallel to an axial center of the tubular pad, to thus fill the tubular rigid cup and enhance a stiffness of the bushing assembly when the tubular outer metal of the bushing assembly is moved towards a limit of a range of radial travel.

20 Claims, 4 Drawing Sheets

(56) References Cited

U.S. PATENT DOCUMENTS

| | | | | |
|---|---|---|---|---|
| 5,887,859 | A * | 3/1999 | Hadano | F16F 1/38 |
| | | | | 267/141.1 |
| 6,237,903 | B1 * | 5/2001 | Novak | B60G 7/02 |
| | | | | 267/141.3 |
| 6,293,531 | B1 | 9/2001 | Kato et al. | |
| 6,364,298 | B1 * | 4/2002 | Vossel | F16F 13/14 |
| | | | | 267/140.12 |
| 6,517,062 | B2 * | 2/2003 | Kuwayama | F16F 1/387 |
| | | | | 267/140.12 |
| 6,622,996 | B2 * | 9/2003 | Mayerbock | B60G 7/02 |
| | | | | 267/140.11 |
| 6,688,588 | B2 * | 2/2004 | Vossel | F16F 13/1418 |
| | | | | 267/140.12 |
| 7,370,852 | B2 * | 5/2008 | Nicholson | F16F 1/387 |
| | | | | 267/140.12 |
| 7,866,640 | B2 * | 1/2011 | Funano | B60G 21/052 |
| | | | | 267/141.4 |
| 8,038,132 | B2 * | 10/2011 | Thornhill | F16F 13/1463 |
| | | | | 267/140.12 |
| 9,422,999 | B2 * | 8/2016 | Hermann | F16F 13/1445 |
| 9,556,903 | B2 * | 1/2017 | Conrad | F16C 27/063 |
| 2003/0020223 | A1 * | 1/2003 | Kameda | B21J 9/025 |
| | | | | 267/293 |
| 2012/0099810 | A1 * | 4/2012 | Thornhill | F16C 11/0614 |
| | | | | 384/215 |

* cited by examiner

SYSTEM AND METHOD FOR A BUSHING ASSEMBLY HAVING RADIAL RUBBER STOPPER

CROSS-REFERENCE TO RELATED APPLICATIONS

This application claims the benefit of U.S. Provisional Application No. 62/237,020, filed on Oct. 5, 2015. The entire disclosure of the above application is incorporated herein by reference.

FIELD

The present disclosure relates to bushing assemblies, and more particularly to a bushing assembly that makes use of a radial stopper assembly which enables improved tuning of a total travel of the bushing assembly, as well as an improved ability to tune a ramp-up force that the bushing assembly experiences during its travel.

BACKGROUND

The statements in this section merely provide background information related to the present disclosure and may not constitute prior art.

In a lower portion of a front suspension of a vehicle there are typically two main bushings that contribute to the feel of a vehicle, the ride bushing and the handling bushing, as shown in FIG. 1. The handling bushing contributes to the stiffness of the steering. The ride bushing helps to control how much wheel impact, such as when the vehicle hits a pothole, that the driver and the passenger(s) will feel. It is important to shut the travel of the bushing down to ensure that the vehicle does not have a shaky feel. It is equally important that the travel is not reduced too rapidly or else wheel impacts will feel sharp and jarring to the driver and passenger(s) riding in the vehicle.

More particularly, as also shown in FIG. 1, in a typical vehicle suspension, as the wheel moves fore-aft, the control arm link (L) will move the outer tube of the bushing, along with the inner metal of the stopper and its internal cup structure fixed thereto, in the Y-direction. With bushings, a radial stopper is used as a way of limiting the linear and/or total travel in the specified radial direction (i.e., Y direction). Radial stoppers are most commonly used in Hydroelastic™ bushings, which are available from Tenneco, Inc. of Lake Forest, Ill., due to the limited package space for the bushing. Axial and radial stoppers used with present day bushing assemblies typically consist of a rubber pad which is used to ramp up the load (in the Y direction) which restricts the travel of the bushing at a given load. However, the rubber that makes up the radial stopper is typically free to bulge on all of its sides as the bushing applies an increasing force on the stopper during its travel. This bulging of the rubber makes it difficult to ramp up the load, reduce the total travel of the bushing, and reduce strains below preset design standards for a given package size.

Conventional radial stoppers that utilize material to form a hard stop, such as plastic and/or metal, usually have limited package space but require the bushing to carry high loads. This method causes an abrupt stop or a minimal rate ramp-up which is usually poor for vehicle dynamics.

When rubber is incorporated into a conventional radial stopper, a minimum load bearing area is required to limit the strain below an acceptable level. One way of tuning the total travel with a rubber stopper is to increase the load bearing area. This is not always feasible due to a limited footprint designed in for the stopper. The other way of tuning the total travel is to make the rubber thickness of the stopper thinner. This causes a more abrupt stop which is typically not desired for vehicle dynamics.

Accordingly, with bushing assemblies having a conventional radial rubber stopper construction as described above, there is no way to reliably tune the total travel of the bushing assembly while maintaining a desired, plush/gradual rate force ramp-up for the bushing assembly.

SUMMARY

In one aspect the present disclosure relates to a bushing assembly comprising a tubular inner metal, a tubular outer metal, a tubular rigid cup disposed over an outer portion of the tubular inner metal, and a tubular pad disposed between the tubular rigid cup and the tubular outer metal. The tubular pad may have a first wall section and a second wall section at least partially circumscribing the first wall section. The first wall section of the tubular pad may be configured to be compressed and to expand along an axis parallel to an axial center of the tubular pad, to thus fill the tubular rigid cup and enhance a stiffness of the bushing assembly when the tubular outer metal of the bushing assembly is moved towards a limit of a range of axial travel.

In another aspect the present disclosure relates to a bushing assembly comprising a tubular inner metal, a tubular outer metal, a rigid surface member disposed on an inner surface of the tubular outer metal, a tubular rigid cup disposed over an outer portion of the tubular inner metal, and a tubular pad disposed between the tubular rigid cup and the rigid surface member. The tubular rigid cup may have a first wall section and a second wall section at least partially circumscribing the first wall section. The first wall section of the tubular pad may be configured to be compressed by the rigid surface member and to expand along an axis parallel to an axial center of the tubular pad, to thus fill the tubular rigid cup and enhance a stiffness of the bushing assembly when the tubular outer metal of the bushing assembly is moved towards a limit of a range of radial travel.

In still another aspect the present disclosure relates to a bushing assembly having a tubular inner metal, a tubular outer metal, a rigid surface member disposed on an inner surface of the tubular outer metal, a tubular rigid cup disposed over an outer portion of the tubular inner metal, and a tubular pad. The tubular rigid cup may include an annular rim, and the tubular pad may be disposed between the tubular rigid cup and the rigid surface member. The tubular pad may have a first wall section and a second wall section at least partially circumscribing the first wall section. The first wall section may be thicker than the second wall section. The first and second wall sections may form an annular pocket therebetween, with the annular pocket receiving the annular rim. The first wall section of the tubular pad is configured to be compressed by the rigid surface member and to expand along an axis parallel to an axial center of the tubular pad, to thus fill the tubular rigid cup and enhance a stiffness of the bushing assembly when the tubular outer metal of the bushing assembly is moved towards a limit of a range of radial travel.

BRIEF DESCRIPTION OF THE DRAWINGS

The drawings described herein are for illustration purposes only and are not intended to limit the scope of the present disclosure in any way.

DETAILED DESCRIPTION

Figure 1:
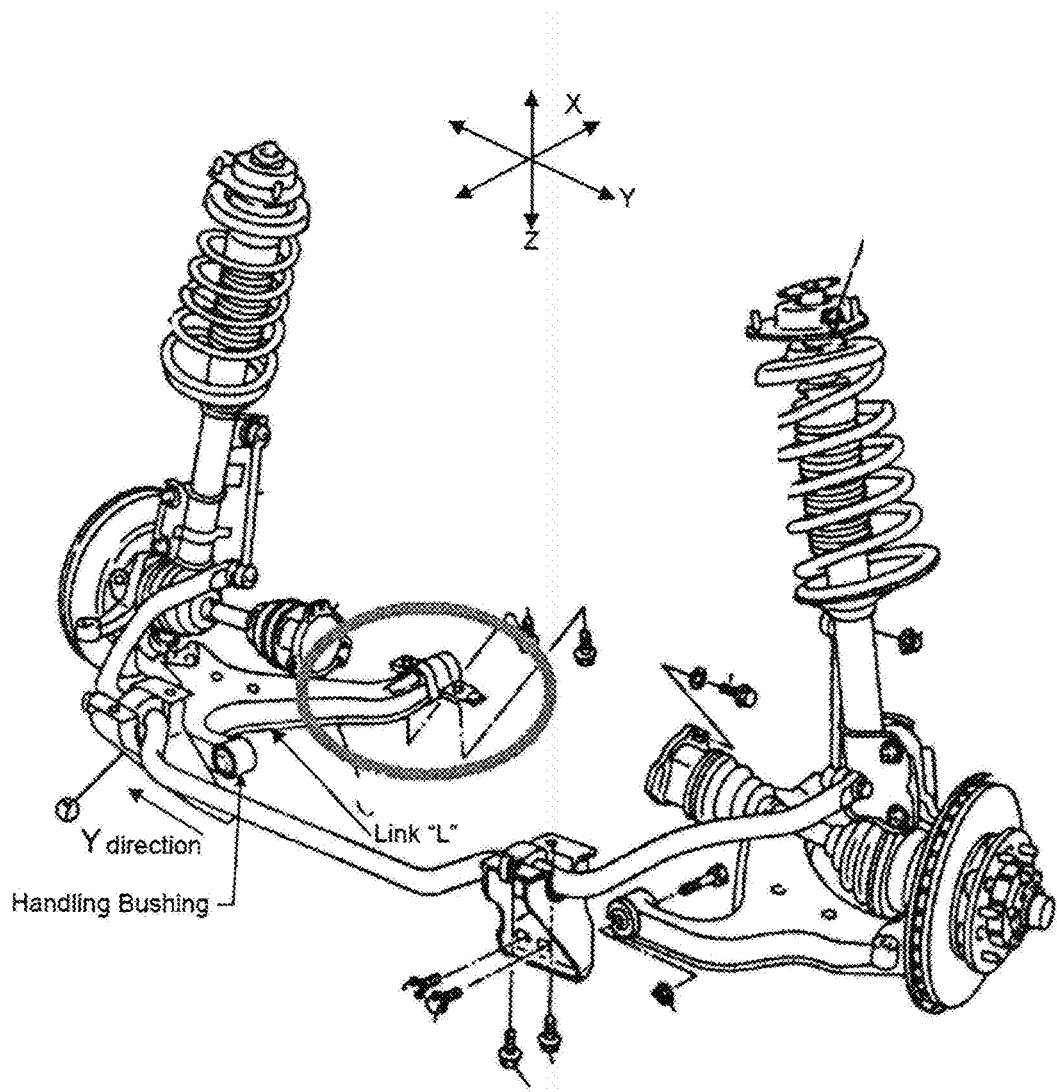
FIG. 1 is a prior art perspective illustration of a well-known suspension system for a motor vehicle illustrating, as one example, where the bushing assembly stopper of the present disclosure can be integrated in connection with a handling bushing of the suspension system.

The following description is merely exemplary in nature and is not intended to limit the present disclosure, application, or uses. It should be understood that throughout the drawings, corresponding reference numerals indicate like or corresponding parts and features.

Figure 2:
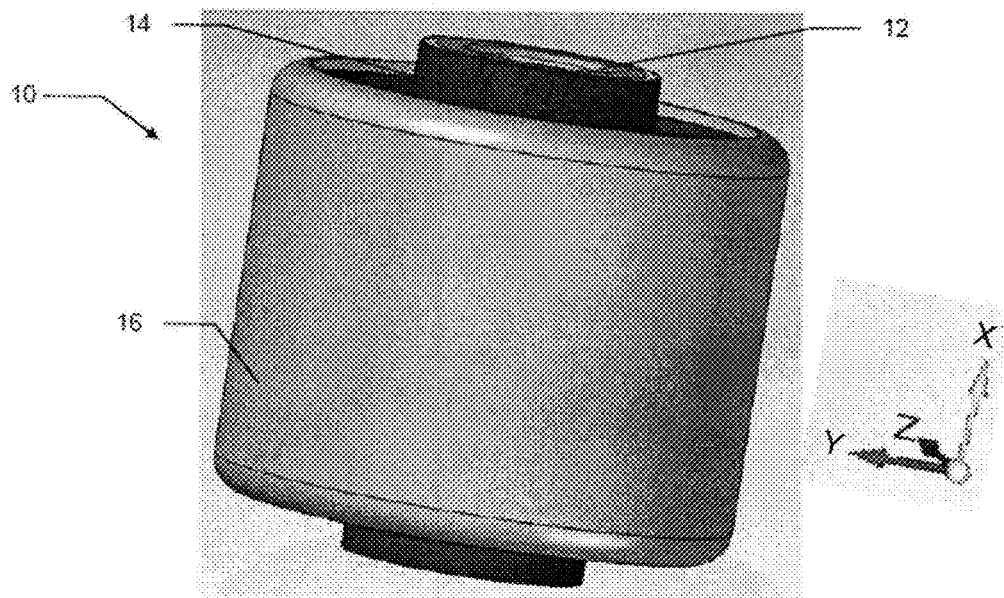
FIG. 2 is a perspective view of a bushing assembly in accordance with one embodiment of the present disclosure.
Figure 3:
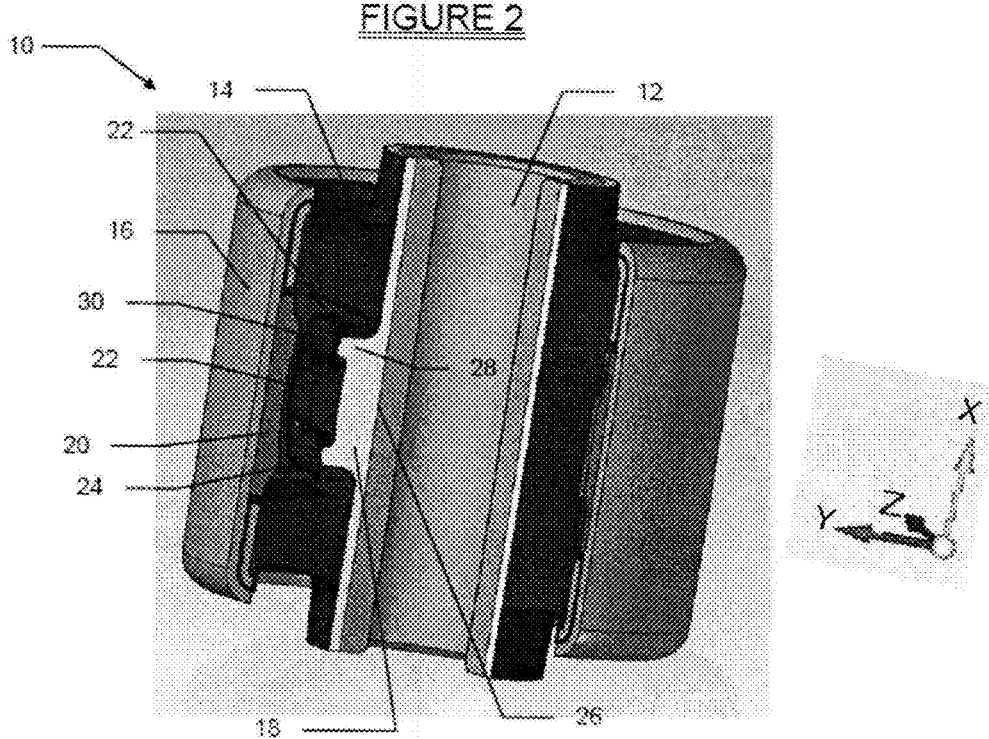
FIG. 3 is a partial cross sectional view of the bushing assembly of FIG. 2 showing in greater detail the radial stopper assembly used in the bushing assembly.

Referring initially to FIGS. 2 and 3 there is shown a bushing assembly 10 having a radial stopper assembly (herein after simply "bushing 10") in accordance with one embodiment of the present disclosure. The bushing 10 is used to help control a ramp up of a load being experienced by the bushing, where the load is generated by movement of a suspension component associated with a wheel of a vehicle.

The bushing 10 generally includes a tubular inner metal component 12, a tubular rubber pad 14 forming a rubber stopper, a tubular outer metal 16, a tubular rigid cup 18 (the cup 18 being visible in FIG. 3), and a rigid surface member 20. The components 12-20 may be press fit onto one another to form a unitary structure. Preferably, a suitable bonding agent is used to help secure the rubber pad 14 to the rigid cup 18. The rubber pad 14 may alternatively be formed from any suitable elastomeric or elastomer-like material, and thus the bushing 10 is not limited to use with only a rubber pad 14. The inner metal 12 may be bolted directly to the vehicle's subframe.

Figure 4:
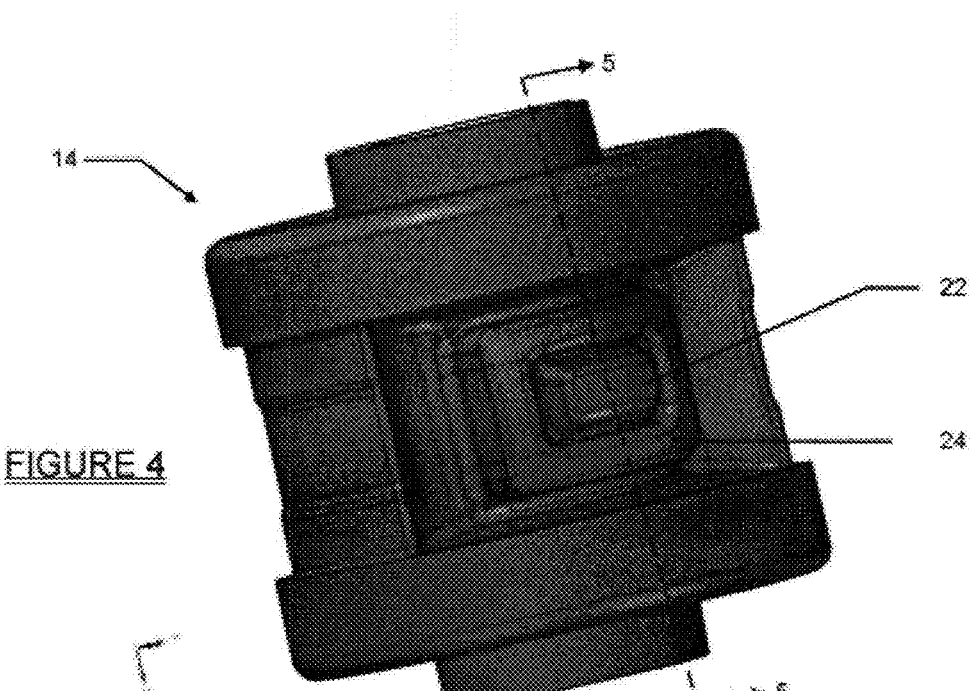
FIG. 4 is a perspective view of just the rubber pad of the radial stopper assembly.
Figure 5:
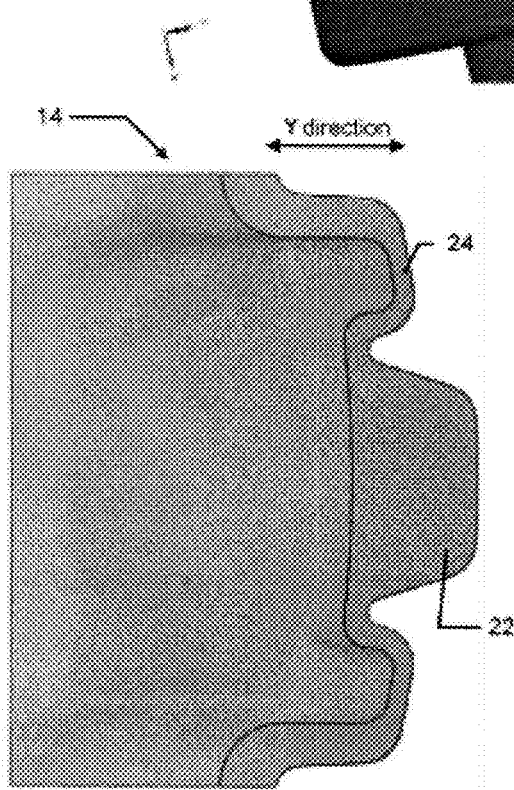
FIG. 5 is a partial side cross sectional view of the rubber pad in accordance with section line 5-5 in FIG. 4 showing the rubber pad in its uncompressed state.

As shown in FIGS. 3-5, the rubber pad 14 forms a resilient component which has a thicker wall section at its centerline 22 and a thinner wall 24 along its perimeter. As shown particularly in FIG. 3, the rigid cup 18 has a closed bottom 26 and sides but an open annular rim 28 located along an upper area thereof, similar to that of a cup. This annular rim 28 engages an annular pocket 30 formed in the rubber pad 14.

Figure 7:
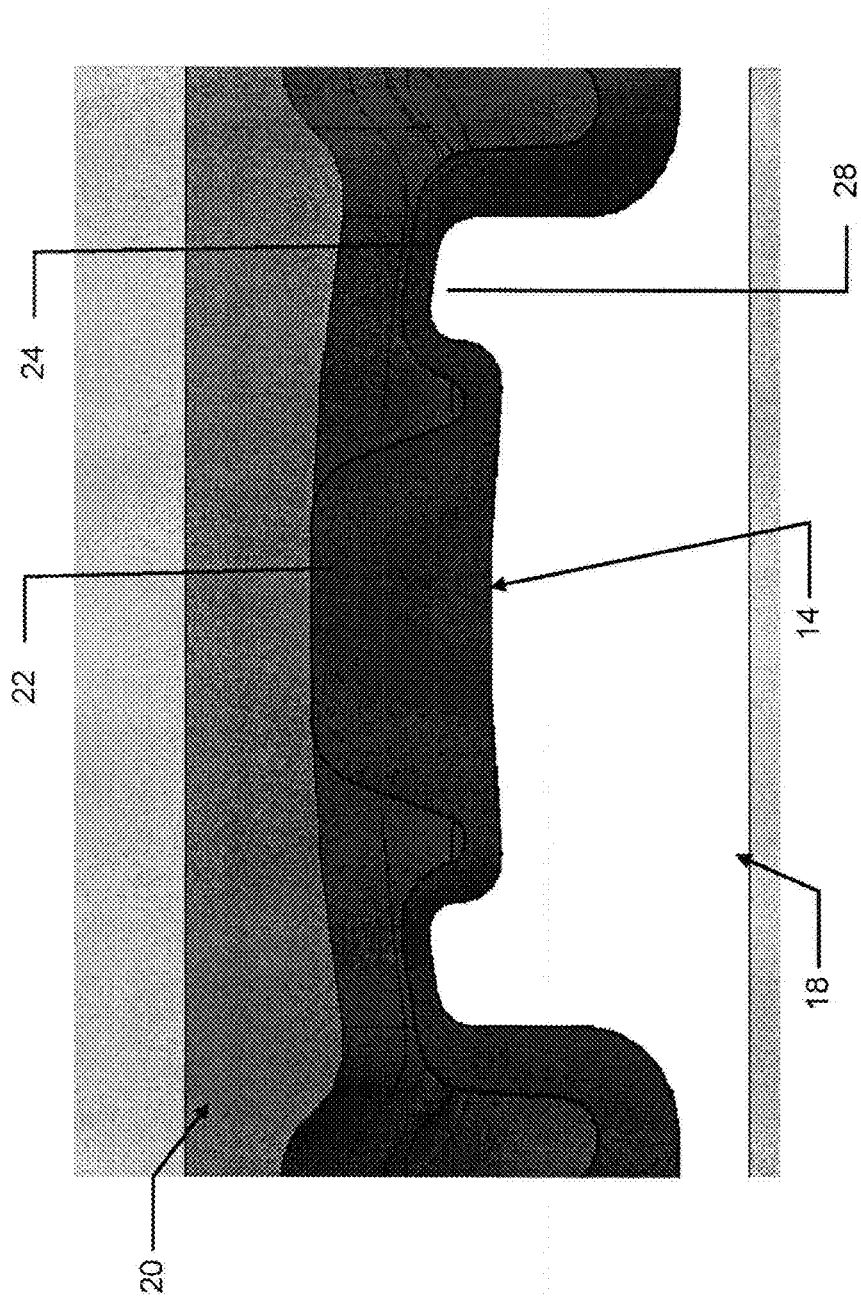
FIG. 7 shows a portion of the radial stopper assembly with the rubber pad in its uncompressed state.

In a vehicle event that causes the wheel to recess (i.e., move in the X direction in the illustration of FIG. 1), the control arm link "L" (FIG. 1) will cause the outer metal tubular 16 along with the rigid surface member 20 to compress and displace the rubber pad 14 to fill-out the rigid cup 18. The uncompressed rubber pad 14 is shown in FIG. 7, and the compressed, displaced rubber pad is shown in FIG. 5.

Figure 6:
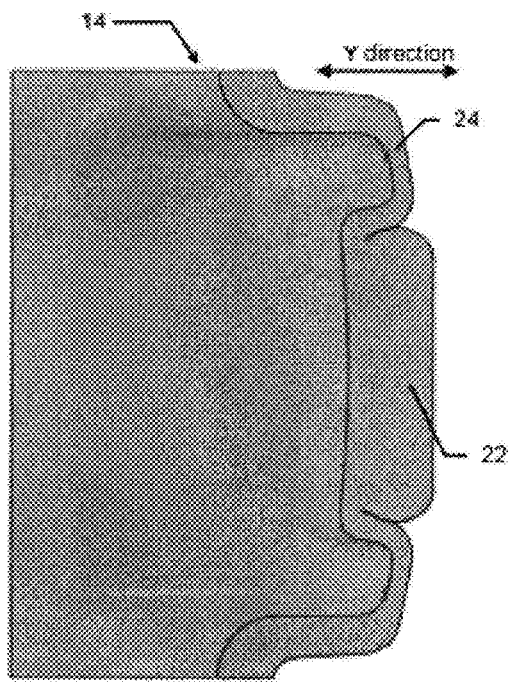
FIG. 6 is a view of the rubber pad of FIG. 5 but showing the rubber pad in its fully compressed state, wherein the centerline of the pad has been compressed to cause a controlled bulge outwardly parallel to an axial centerline of the rubber pad.

FIGS. 5 and 6 are cross sectional views generated using Finite Element Analysis on the rubber pad 14 to show the lockout of the rubber pad 14 in its uncompressed state (FIG. 5) and in its fully compressed state (FIG. 6). As the rigid surface member 20 compresses and displaces the rubber pad 14, the centerline 22 of the rubber pad expands in a direction parallel to an axial center of the rubber pad to fill the volume of the rigid cup 18 and increase its stiffness. Once the volume of the rigid cup 18 is completely filled with rubber from the rubber pad 14, the stiffness increases significantly. The rigid cup 18, and particularly its annular rim 28, inhibits the rubber material from the rubber pad 14 from bulging further along the direction parallel to the axial center of the rubber pad, and takes advantage of the incompressibility of rubber. The uncompressed rubber pad 14 shape in this example is generally that of a trapezoid. This shape causes the rubber of the rubber pad 14 to fill the rigid cup 18 from the bottom up to avoid pinching the bulge of the rubber pad 14 between the rigid surface member 20 and the annular rim 28 of the rigid cup 18.

The invention thus forms an improved bushing assembly which provides better tuning of a total radial travel of the bushing, while simultaneously enabling even better tailoring of the ramp-up force being exerted by a bushing assembly. In particular the invention controllably restricts the amount of axial bulging that the rubber of a rubber pad of a radial stopper can exhibit, which in turn limits the strain on the rubber. At a full travel condition, this makes the bushing 10 of the present disclosure as stiff as its surrounding supporting structures due to the incompressibility of rubber.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A bushing assembly comprising:
    a tubular inner metal;
    a tubular outer metal;
    a tubular rigid cup disposed over an outer portion of the tubular inner metal;
    a tubular pad disposed between the tubular rigid cup and the tubular outer metal, and having a first wall section and a second wall section at least partially circumscribing the first wall section; and
    the first wall section of the tubular pad configured to be compressed and expand along an axis parallel to an axial center of the tubular pad, to thus fill the tubular rigid cup and enhance a stiffness of the bushing assembly when the tubular outer metal of the bushing assembly is moved towards a limit of a range of radial travel.

2. The bushing assembly of claim 1, further comprising a rigid surface member secured to an inner surface of the tubular outer metal, and wherein the rigid surface member assists in compressing the first wall section when the tubular outer metal is moved towards the limit of the range of radial travel.

3. The bushing assembly of claim 1, wherein the first wall section of the bushing assembly is thicker than the second wall section.

4. The bushing assembly of claim 1, wherein:
    the first and second wall sections define an annular pocket therebetween; and the tubular rigid cup includes an annular rim which engages the annular pocket and helps to limit axial bulging of the first wall section of the tubular pad as the tubular outer metal is moved towards the limit of its range of travel.

5. The bushing assembly of claim 1, wherein the tubular pad is secured to the tubular rigid cup by a bonding agent.

6. The bushing assembly of claim 1, wherein the tubular pad comprises a tubular rubber pad that forms a rubber stopper.

7. The bushing assembly of claim 1, wherein the tubular pad comprises a tubular elastomeric pad that forms an elastomeric stopper.

8. The bushing assembly of claim 1, wherein the tubular inner metal is adapted to be secured to a subframe of a vehicle on which the bushing assembly is being used.

9. The bushing assembly of claim 1, wherein the tubular outer metal is adapted to be responsive to movement of a control arm link of a vehicle on which the bushing assembly is being used.

10. The bushing assembly of claim 1, wherein the tubular pad, the tubular outer metal, the tubular cup and the tubular inner metal are assembled using a press fit construction.

11. A bushing assembly comprising:
a tubular inner metal;
a tubular outer metal;
a rigid surface member disposed on an inner surface of the tubular outer metal;
a tubular rigid cup disposed over an outer portion of the tubular inner metal;
a tubular pad disposed between the tubular rigid cup and the rigid surface member, and having a first wall section and a second wall section at least partially circumscribing the first wall section; and
the first wall section of the tubular pad configured to be compressed by the rigid surface member and to expand along an axis parallel to an axial center of the tubular pad, to thus fill the tubular rigid cup and enhance a stiffness of the bushing assembly when the tubular outer metal of the bushing assembly is moved towards a limit of a range of radial travel.

12. The bushing assembly of claim 11, wherein the first wall section of the bushing assembly is thicker than the second wall section.

13. The bushing assembly of claim 11, wherein:
the first and second wall sections define an annular pocket therebetween; and
the tubular rigid cup includes an annular rim which engages the annular pocket and helps to limit axial bulging of the first wall section of the tubular pad as the tubular outer metal is moved towards the limit of the range of radial travel.

14. The bushing assembly of claim 11, wherein the tubular pad comprises a tubular rubber pad.

15. The bushing assembly of claim 11, wherein the tubular pad comprises a tubular elastomeric pad.

16. The bushing assembly of claim 11, wherein the tubular pad, the tubular outer metal, the tubular cup, the rigid surface member and the tubular inner metal are assembled using a press fit construction.

17. A bushing assembly comprising:
a tubular inner metal;
a tubular outer metal;
a rigid surface member disposed on an inner surface of the tubular outer metal;
a tubular rigid cup disposed over an outer portion of the tubular inner metal, the tubular rigid cup including an annular rim;
a tubular pad disposed between the tubular rigid cup and the rigid surface member, the tubular pad having a first wall section and a second wall section at least partially circumscribing the first wall section, the first wall section being thicker than the second wall section, and the first and second wall sections forming an annular pocket therebetween, the annular pocket receiving the annular rim; and
the first wall section of the tubular pad configured to be compressed by the rigid surface member and to expand along an axis parallel to an axial center of the tubular pad, to thus fill the tubular rigid cup and enhance a stiffness of the bushing assembly when the tubular outer metal of the bushing assembly is moved towards a limit of a range of radial travel.

18. The bushing assembly of claim 17, wherein the annular rim of the tubular rigid cup operates to help limit axial bulging of the first wall section of the tubular pad as the tubular outer metal is moved towards the limit of the range of axial travel, and to fill the tubular rigid cup with material from the tubular pad.

19. The bushing assembly of claim 17, wherein the tubular pad comprises a tubular rubber pad forming a rubber stopper.

20. The bushing assembly of claim 17, wherein the tubular pad comprises a tubular elastomeric pad forming an elastomeric stopper.

* * * * *